US012625492B2

(12) United States Patent
Delpech et al.

(10) Patent No.: US 12,625,492 B2
(45) Date of Patent: May 12, 2026

(54) MANAGEMENT OF PROCESS SAFETY RISK IN A PROCESS FACILITY

(71) Applicant: Honeywell International Inc., Charlotte, NC (US)

(72) Inventors: Adam Delpech, Padstow (AU); Graeme John Laycock, Hunters Hill (AU); Andrew Huynh, Moris Plains, NJ (US); David Barry Granatelli, Rozelle (AU); Jack Tsai, Wahroonga (AU); Prasad Goteti, Sugarland, TX (US); Anthony M. Downes, Morristown, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 491 days.

(21) Appl. No.: 18/001,664

(22) PCT Filed: Jun. 11, 2021

(86) PCT No.: PCT/US2021/037103
§ 371 (c)(1),
(2) Date: Dec. 13, 2022

(87) PCT Pub. No.: WO2021/252964
PCT Pub. Date: Dec. 16, 2021

(65) Prior Publication Data
US 2023/0259108 A1     Aug. 17, 2023

Related U.S. Application Data

(60) Provisional application No. 63/038,766, filed on Jun. 13, 2020.

(51) Int. Cl.
*G05B 23/02*          (2006.01)

(52) U.S. Cl.
CPC ..... *G05B 23/0216* (2013.01); *G05B 23/0272* (2013.01); *G05B 23/0286* (2013.01)

(58) Field of Classification Search
CPC ............ G05B 23/0216; G05B 23/0272; G05B 23/0286; G05B 2219/24008
See application file for complete search history.

(56) References Cited

U.S. PATENT DOCUMENTS

| | | | |
|---|---|---|---|
| 10,599,501 B2 | 3/2020 | Yoshida et al. | |
| 2008/0066004 A1* | 3/2008 | Blevins .................. | G06Q 50/04 715/771 |

(Continued)

FOREIGN PATENT DOCUMENTS

WO     WO-2021252964 A1     12/2021

OTHER PUBLICATIONS

"International Application Serial No. PCT/US2021/037103, International Search Report mailed Sep. 21, 2021", 5 pgs.

(Continued)

*Primary Examiner* — Robert E Fennema
*Assistant Examiner* — Marzia T Monty
(74) *Attorney, Agent, or Firm* — ALSTON & BIRD LLP

(57) ABSTRACT

A computer implemented method includes receiving, by the computer, a request to display a process safety risk matrix associated with a process facility and displaying the process safety risk matrix. The process safety risk matrix includes a 2-dimensional representation of a plurality of risk matrix cells, each of the plurality of risk matrix cells associated with a combination of a likelihood level and a severity level. The computer implemented method includes displaying, by the computer, an indication of a hazardous process event scenario within a first cell within the process safety risk matrix, the cell location determined based on a Target Mitigated Event Likelihood (TMEL) and a Safety Severity.

(Continued)

The computer implemented method includes displaying, by the computer, an indication of a second graphic indication on a second cell to identify a change in a hazardous scenario count associated with the second cell.

20 Claims, 8 Drawing Sheets

(56)                References Cited

U.S. PATENT DOCUMENTS

| | | | | |
|---|---|---|---|---|
| 2012/0303150 | A1* | 11/2012 | Krishnaswamy .. | G05B 23/0251 |
| | | | | 700/110 |
| 2014/0277619 | A1* | 9/2014 | Nixon ................ | G05B 23/0272 |
| | | | | 700/83 |
| 2015/0154496 | A1* | 6/2015 | Martin ................... | G06N 5/027 |
| | | | | 706/11 |
| 2015/0358218 | A1* | 12/2015 | Nasir .................. | H04L 41/0803 |
| | | | | 709/224 |
| 2018/0189741 | A1* | 7/2018 | Tamura .................... | F24F 11/64 |
| 2018/0308027 | A1* | 10/2018 | Cline ................. | G06Q 10/0635 |
| 2021/0134143 | A1* | 5/2021 | Subramanian ....... | G06V 10/765 |

OTHER PUBLICATIONS

"International Application Serial No. PCT/US2021/037103, Written Opinion mailed Sep. 21, 2021", 6 pgs.

Gulland, W G, "Methods of Determining Safety Integrity Level(SIL) Requirements—Pros and Cons", (Dec. 10, 2004), 1-17.

* cited by examiner

BYPASS RISK EVENT TABLE 210                                                                220

| RISK EVENT CATEGORIES | EVENTS IN THE LAST WEEK |
|---|---|
| ③ BYPASS | 5 |
| ① DEMAND | 6 |
| ① SPURIOUS TRIP | 3 |
| ① LATE TESTING | 1 |

400

BASELINE CONTROL MEASURE HISTORY

500

RECOMMENDATION TABLE

520

| IDENTIFIED | SHELVED | PROGRESSED | DONE |
|---|---|---|---|

510

EVENT 1
RECOMMENDATION
DATE - STATUS

EVENT 2
RECOMMENDATION
DATE - STATUS

EVENT 3
RECOMMENDATION
DATE - STATUS

EVENT 4
RECOMMENDATION
DATE - STATUS

EVENT 5
RECOMMENDATION
DATE - STATUS

600

PROCESS HAZARD
ANALYSIS (PHA)  650

LAYER OF PROTECTION
ANALYSIS (LOPA)  660

SAFETY REQUIREMENT
SPECIFICATION (SRS)  670

SAFETY INTEGRITY LEVEL
(SIL) CALCULATION  680

TESTING DATA  690

640

OPERATIONAL PROCESS
RISK DATA

610

PLANT DATA

620

HISTORIAN

SIF TIME IN BYPASS
SIF DEMANDS

COMPUTER MAINTENANCE
MANAGEMENT SYSTEM
(CMMS)

SIF ON-TIME
TESTING

630

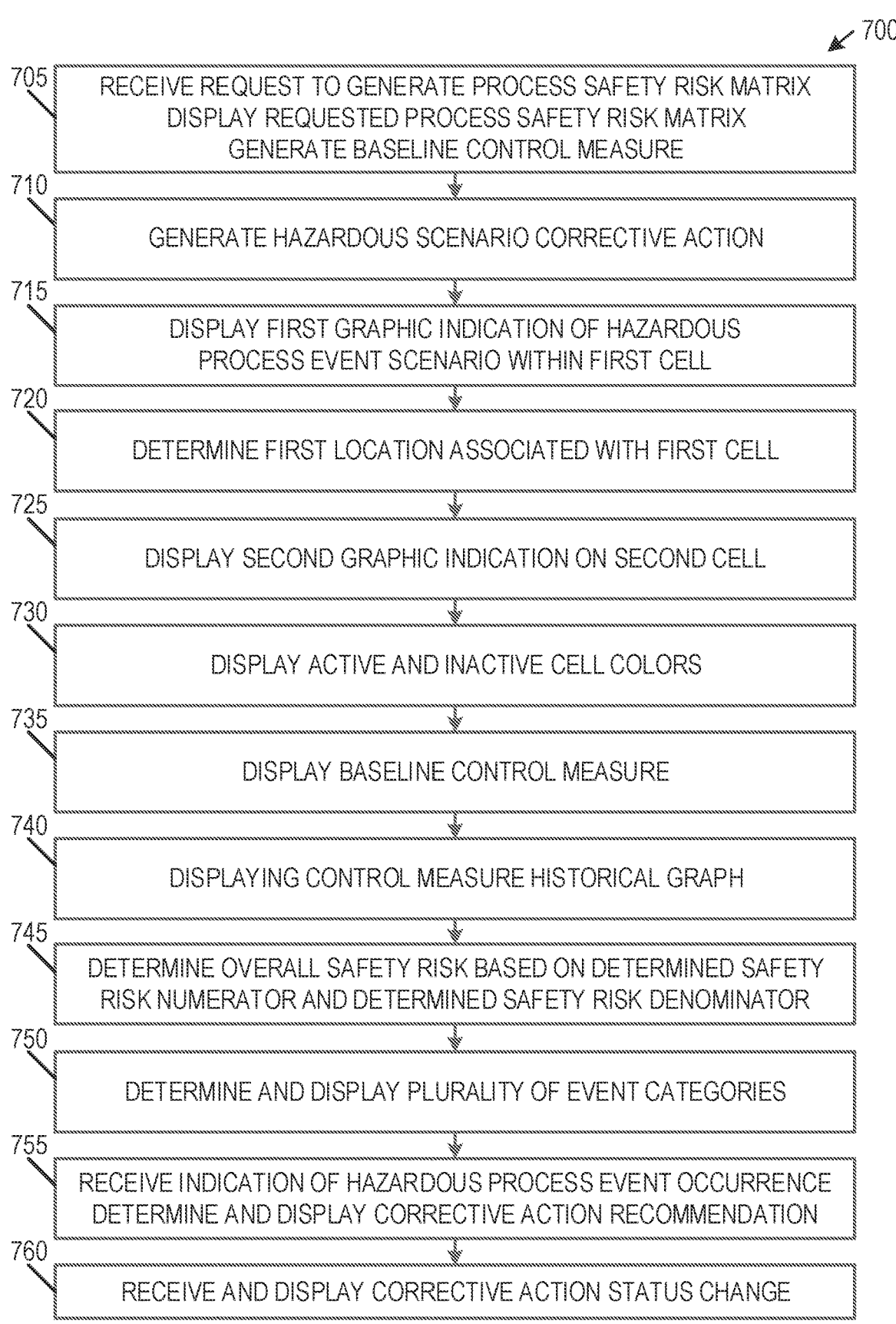

700

705 RECEIVE REQUEST TO GENERATE PROCESS SAFETY RISK MATRIX
DISPLAY REQUESTED PROCESS SAFETY RISK MATRIX
GENERATE BASELINE CONTROL MEASURE

710 GENERATE HAZARDOUS SCENARIO CORRECTIVE ACTION

715 DISPLAY FIRST GRAPHIC INDICATION OF HAZARDOUS
PROCESS EVENT SCENARIO WITHIN FIRST CELL

720 DETERMINE FIRST LOCATION ASSOCIATED WITH FIRST CELL

725 DISPLAY SECOND GRAPHIC INDICATION ON SECOND CELL

730 DISPLAY ACTIVE AND INACTIVE CELL COLORS

735 DISPLAY BASELINE CONTROL MEASURE

740 DISPLAYING CONTROL MEASURE HISTORICAL GRAPH

745 DETERMINE OVERALL SAFETY RISK BASED ON DETERMINED SAFETY
RISK NUMERATOR AND DETERMINED SAFETY RISK DENOMINATOR

750 DETERMINE AND DISPLAY PLURALITY OF EVENT CATEGORIES

755 RECEIVE INDICATION OF HAZARDOUS PROCESS EVENT OCCURRENCE
DETERMINE AND DISPLAY CORRECTIVE ACTION RECOMMENDATION

760 RECEIVE AND DISPLAY CORRECTIVE ACTION STATUS CHANGE

*FIG. 7*

MANAGEMENT OF PROCESS SAFETY RISK IN A PROCESS FACILITY

RELATED APPLICATION

This application is a U.S. national stage application filing under 35 U.S.C. 371 from International Application No. PCT/US2021/037103, filed Jun. 11, 2021, and published as WO 2021/252964 A1 on Dec. 16, 2021, which claims priority to U.S. Provisional Application Ser. No. 63/038,766 (entitled Operations Safety Advisory, filed Jun. 13, 2020) which applications are incorporated herein by reference.

BACKGROUND

A processing plant may include one or more processes that have associated process risks. For example, a plant may include a pressure vessel used to store hydrocarbons, where uncontrolled high pressure can lead to vessel rupture and release of hydrocarbons in the atmosphere. This process risk leads to a potentially hazardous event, such as an explosion, injury, or death. A Safety Instrumented Function (SIF) is used to reduce the likelihood of a hazardous event. However, each SIF may not provide the intended safety features, such as through SIF failure or manual bypass of the SIF, and may not provide adequate protection against hazardous events.

SUMMARY

A computer implemented method includes receiving, by the computer, a request to display a process safety risk matrix associated with a process facility and displaying the process safety risk matrix. The process safety risk matrix includes a 2-dimensional representation of a plurality of risk matrix cells, each of the plurality of risk matrix cells associated with a combination of a likelihood level and a severity level. The computer implemented method includes displaying, by the computer, an indication of a hazardous process event scenario within a first cell within the process safety risk matrix, the cell location determined based on a Target Mitigated Event Likelihood (TMEL) and a Safety Severity. The computer implemented method includes displaying, by the computer, an indication of a second graphic indication on a second cell to identify a change in a hazardous scenario count associated with the second cell.

BRIEF DESCRIPTION OF THE DRAWINGS

FIG. 7 is a flowchart illustrating a computer implemented method for process safety risk matrix generation and display according to an example embodiment.

DETAILED DESCRIPTION

Figure 1:
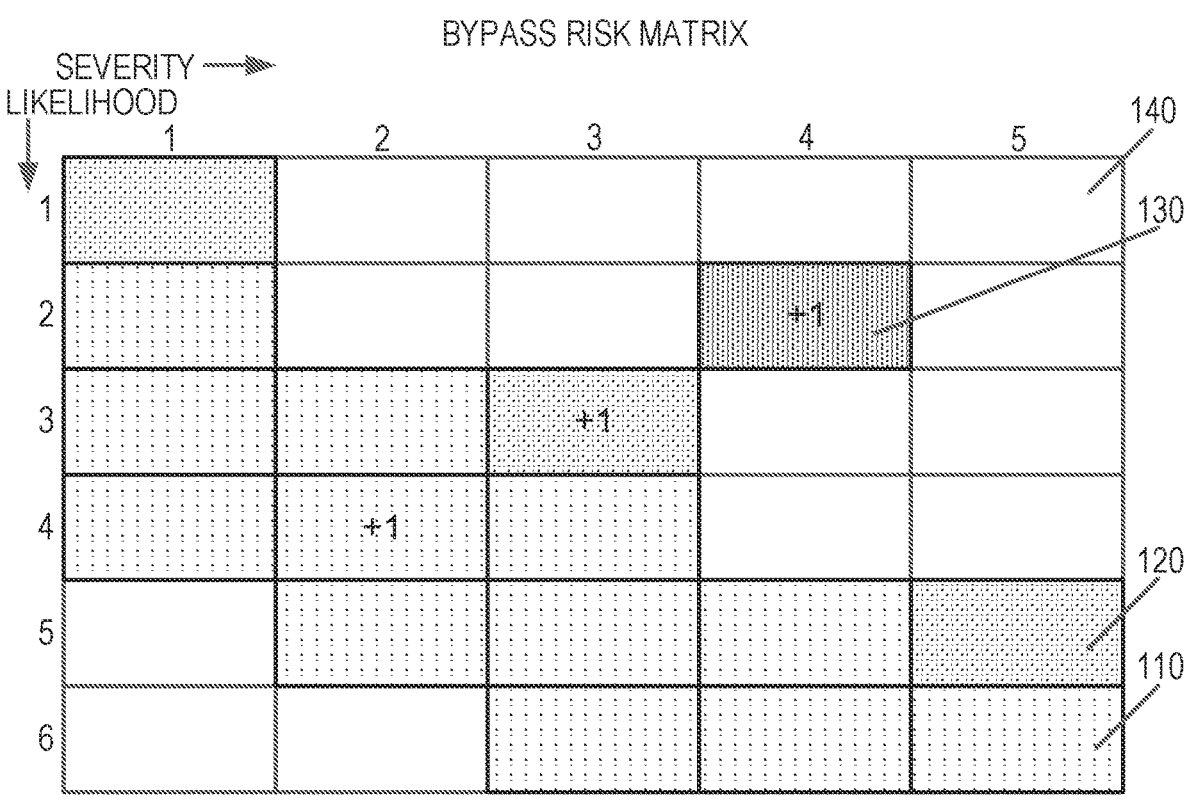
FIG. 1 is a diagram of a risk matrix according to an example embodiment.

In the following description, reference is made to the accompanying drawings that form a part hereof, and in which is shown by way of illustration specific embodiments which is practiced. These embodiments are described in sufficient detail to enable those skilled in the art to practice the invention, and it is to be understood that other embodiments is utilized and that structural, logical and electrical changes is made without departing from the scope of the present invention. The following description of example embodiments is, therefore, not to be taken in a limited sense, and the scope of the present invention is defined by the appended claims.

The functions or algorithms described herein is implemented in software in one embodiment. The software may consist of computer executable instructions stored on computer readable media or computer readable storage device such as one or more non-transitory memories or other type of hardware based storage devices, either local or networked. Further, such functions correspond to modules, which is software, hardware, firmware or any combination thereof. Multiple functions is performed in one or more modules as desired, and the embodiments described are merely examples. The software is executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof, A component is a process running on a processor, an object, an executable, a program, a function, a subroutine, a computer, or a combination of software and hardware. The term, "processor," may refer to a hardware component, such as a processing unit of a computer system.

Furthermore, the claimed subject matter is implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

To technical problems facing the limitations of a SIF in reducing the likelihood of a hazardous event, an Operations Safety Advisor (OSA) provides both a visualization (e.g., dashboard) and an interface to analyze short-term or long-term risk, and to analyze and address corrective action recommendations. The OSA provides a visualization of real-time changes in risk on a dynamic risk matrix, which provides improved information and corrective actions over a process that includes an infrequent determination of process safety risk. This visualization of real-time changes in risk provides an intuitive and clear understanding of the effect of events to process safety risk levels.

To improve process safety risk assessment, the OSA may provide an improved scoring of a process safety risk level relative to an accepted risk baseline. This OSA provides an improved solution for generating and displaying a process safety risk score based on the severity of one or more bypassed SIF or other protection layers.

The OSA provides improved visualization of change in process safety risk levels in real-time without requiring user intervention. In particular, the OSA provides an improved display of a change on a risk matrix, which provides an intuitive and straightforward way to visualize how an event has affected the process safety risk level, including visualization of the severity and likelihood of a given hazardous risk scenario. The OSA scoring process may also provide an unproved process insight, such as providing an improved process site score associated with a process safety level. Using this OSA, a process analyst is more aware of process risk level changes and react to these changes more quickly, improving the safety of processing plants and reducing safety incidents. This OSA may also improve the ability of a process analyst to understand a site risk level and compare the risk level across sister facilities.

FIG. 1 is a diagram of a risk matrix 100. Risk matrix 100 indicates the presence of one or more hazardous process event scenarios. Risk matrix 100 is generated in response to a received request to display a process safety risk matrix associated with a process facility. Risk matrix may include a 2-dimensional representation of cells, each cell associated with a unique combination of a severity level and a likelihood level. Table 1 shows an example set of hazardous process event scenarios:

TABLE 1

| SIF Scenarios | | | |
|---|---|---|---|
| Scenario | Likelihood | Severity | Risk |
| Without a SIF | 5 | 2 | 3 (Unacceptable) |
| With SIF 1 | 3 | 2 | 5 (Tolerable) |
| With both SIF 1 and SIF 2 | 1 | 2 | 7 (Acceptable) |

One or more hazardous process event scenarios may have an associated likelihood level and a severity level. Each likelihood level and severity level may have an associated likelihood probability and severity outcome, such as shown in Table 2:

TABLE 2

| Likelihood and Severity | | | |
|---|---|---|---|
| | Likelihood | | Severity |
| 1 | Once in 10,000 years | 1 | Multiple Fatalities |
| 2 | Once in 1,000 years | 2 | Single Fatality |
| 3 | Once in 100 years | 3 | Serious Injury |
| 4 | Once in 10 years | 4 | First Aid |
| 5 | Once in 1 year | 5 | First Aid |
| 6 | Multiple times per year | 6 | First Aid |

Within risk matrix 100, if at least one cell in the risk matrix 100 corresponds with the associated likelihood level and a severity level, risk matrix 100 may include a graphical indication of the presence of at least one hazardous process event scenario.

In one embodiment, a first graphic indication of a hazardous process event scenario is displayed within a first cell 110 within the risk matrix 100. The first cell 110 corresponds to a first likelihood level and a first severity level associated with the hazardous process event scenario. In one embodiment, the first location associated with the first cell is determined based on a Target Mitigated Event Likelihood (TMEL) and a Safety Severity associated with the hazardous process event scenario, such as using likelihood and severity levels in Table 2. In one embodiment, the first likelihood level is determined based on the TMEL, and the severity level is determined based on the Safety Severity.

In one embodiment, one or more cells is displayed with an indication of an associated risk. Risk matrix 100 may include multiple cells associated with an acceptable risk, such as listed in Table 1. As shown in FIG. 1, multiple cells is displayed similar to first cell 110 as associated with an acceptable risk, multiple cells is displayed similar to second cell 120 as associated with a tolerable risk, and multiple cells is displayed similar to third cell 130 as associated with an unacceptable risk. In one embodiment, inactive cells are identified by an inactive indication, such as a background color within inactive cell 140.

In one embodiment, a second graphic indication is displayed to indicate a change in a hazardous scenario count associated with the second cell, such as a numeric indication shown on third cell 130 within risk matrix 100. The second graphic indication identifies a change in a hazardous scenario count associated with the second cell, such as one or more hazardous scenarios that have been moved into a cell relative to a baseline hazardous scenario risk matrix. In one embodiment, movement of cells relative to a baseline hazardous scenario risk matrix indicates a bypass of at least one SW, and the numeric indication provides improved visualization of that bypass and the resultant severity level and likelihood level. In one embodiment, movement of cells relative to a baseline hazardous scenario risk matrix indicates other process risk factors, such as excessive SIF, demands or late testing events (e.g., testing a SW after the end of a recommended testing time).

Figure 2:
FIG. 2 is a diagram of a bypass risk event table according to an example embodiment.

FIG. 2 is a diagram of a bypass risk event table 200. Bypass risk event table 200 provides additional information associated with risk matrix 100, such as risk event categories 210 associated with one or more changes in hazardous scenario counts. In one embodiment, the risk event categories 210 indicates a category and count of each risk event. Each bypass event category is associated with an event that changes the likelihood or severity of a hazardous scenario. In one embodiment, bypass event categories include bypass events (e.g., circumvention of a SIF), demand events (e.g., use of a SIF), spurious trip events (e.g., responding to a false positive Sif failure), and late testing events (e.g., testing a SIF after the end of a recommended testing time). In one embodiment, the bypass risk event table 200 indicates one or more events 220 associated with each event category for a recent period (e.g., for the most recent week. In one embodiment, the recent period may be selected by a user, such as by indicating one or more dates or by selecting from among predetermined periods.

Figure 3:
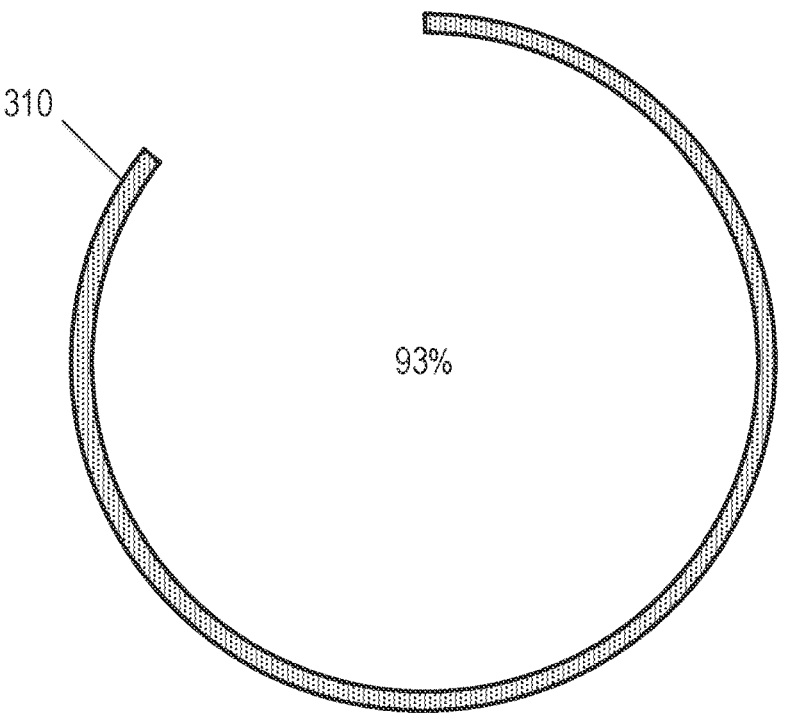
FIG. 3 is a diagram of a baseline control measure according to an example embodiment.

FIG. 3 is a diagram of a baseline control measure 300. In one embodiment, a baseline control measure 300 includes a graphical representation, such as a percentage and circular progress bar 310. In one embodiment, the determination of the baseline control measure 300 is based on a baseline number of hazardous event scenarios, along with a TMEL and a Safety Severity associated with each hazardous event scenario.

Figure 4:
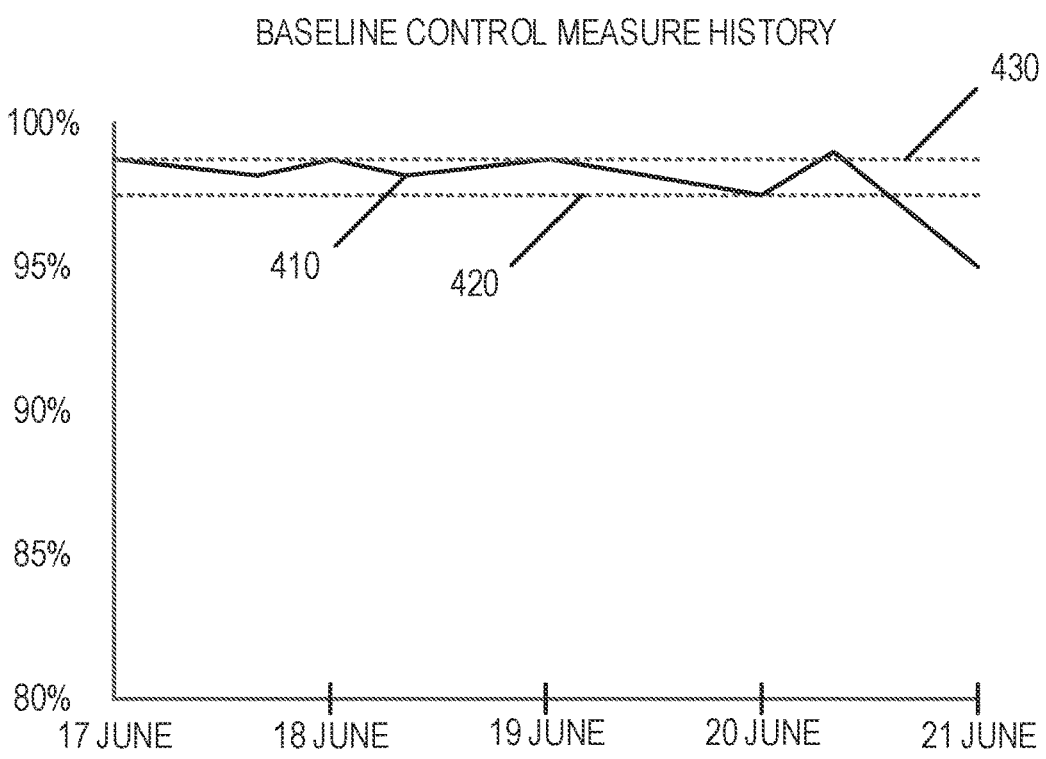
FIG. 4 is a diagram of a baseline control measure history according to an example embodiment.

FIG. 4 is a diagram of a baseline control measure history 400. In one embodiment, baseline control measure history 400 includes a historical graph that includes a historical baseline control measure plot 410, such as a time representation of current and previous baseline control measures. In one embodiment, the historical graph includes a control measure average 420, such as an average of the displayed baseline control measures, in one embodiment, the historical graph includes a control measure target 430, which may be provided by an operator or may be generated based on historic or targeted control measure data.

Figure 5:
FIG. 5 is a diagram of a hazardous event corrective action recommendation table according to an example embodiment.

FIG. 5 is a diagram of a hazardous event corrective action recommendation table 500. In one embodiment, recommendation table 500 includes an indication of one or more hazardous event recommendations 510. In one embodiment, each hazardous event recommendation 510 includes a hazardous event name, recommended corrective action, date the recommended corrective action was generated, and corrective action status indicating whether the event is active or inactive. In one embodiment, recommendation table 500 includes a plurality of recommendation table filter categories 520 to filter the hazardous event scenarios 510.

Figure 6:
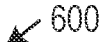
FIG. 6 is a diagram of a Process Risk index (PRI) determination according to an example embodiment.

FIG. 6 is a diagram of a Process Risk Index (PRI) determination 600. In one embodiment, a determination of PRI indicates a Process Risk profile of a Process unit, such as in real time (e.g., short-term risk) or over a longer period (e.g., long-term risk). In one embodiment, PRI is based on hazardous event scenarios that correspond with high severity events (e.g., safety, commercial, environmental events), including events that correspond with an "unacceptable" risk without a SW. In one embodiment, a PRI of 0% is associated with an acceptable criterion, and a PRI of 100% is associated with an unacceptable criteria. In one embodiment, the baseline control measure is generated based on the risk indicated by the PRI. As shown in FIG. 3, a baseline control measure of 93% corresponds to a PRI of 7%. In one embodiment, process risk index determination 600 is based on plant data 610, historian data 620, and computer maintenance management systems (CMMS) 630, which is used to generate operational process risk data 640. In one embodiment, process risk data includes a process hazard analysis (PHA) 650, a layer of protection analysis (LOPA), a safety requirement specification (SRS), a safety integrity level (SIL) calculation, and testing data 690.

In one embodiment, PRI determination 600 includes a short-term risk determination, such as a single shift or single day to provide a plant operations or maintenance manager to understand the status of the process plant. In one embodiment, a safety event (e.g., Safety Risk Index (SRI)) is a driver for a hazardous event, a Probability of Failure on Demand (PFI)) of actual of SW and non-SIF IPL is the same as PFD per design, a SIF input has one-to-one input voting, and any other Independent Protection Layer (IPL) is functioning per design. In one embodiment, the Short Term (ST) Safety Risk index is calculated as follows:

Designed ST Safety Risk=TMEL (for safety)×Safety Severity (e.g., with the designed IPLs, the TMEL has been met)

Actual ST Safety Risk=Initiating Event Frequency (IEF)× [(PFD of non-SIF IPL×PFD)×(Time SIF NOT in Bypass/Short Sample Time (SST))+(PFD of non-SW IPL)×(Time SIF in Bypass/SST]×Safety Severity, where: IEF=Initiating Event Frequency and SST=Short Sample Time ST Safety Risk Index=[Log of (Designed Safety Risk/Actual Safety Risk)/Log of Designed Safety Risk)]× 100

Baseline Control Measure=100−ST Safety Risk Index

In one embodiment, the Short Term (ST) Safety Risk Index is calculated for one example scenario as shown in Table 3:

TABLE 3

| ST Risk Index | | |
|---|---|---|
| Parameter | Source | Value |
| TMEL | Risk and TMEL definition | 1E−05 |
| Safety Severity of "2" | Risk Matrix | Single fatality |
| IEF | BPCS failure | 0.1 per year |
| PFD of PSV-1 | To fill the Risk Gap per Table 1 | 0.01 |
| PFD of SIF-1 | To fill the Risk Gap per Table 1 | 0.01 |
| SST | Assumption | 24 Hours |
| SIF-1 Input Bypassed | Assumption (from Historian data) | 8 Hours |
| Designed Safety Risk | Per Equation 1: | 1E−05 |
| | TMEL (for safety) (1E−05) × Safety Severity (1) | fatalities/year |
| Actual ST Safety Risk | Per Equation 2: | 3.4E−04 |
| | IEF(0.1) × [(PFD of non-SIF IPL(0.01) × SIF PFD(0.01)) × (Time SIF NOT in Bypass (16)/SST(24)) + (PFD of non-SIF IPL(0.01) × (Time SIF in Bypass(8)/ SST(24))] × Safety Severity (1) | fatalities/year |
| Designed Safety Risk/Actual ST Safety Risk) | (1E−05)/(3.4E−04) | 0.0294 |
| Log of (Designed ST Safety Risk) | Log (1E−05) | −5 |
| Log of (Designed Safety Risk/Actual ST Safety Risk) | Log (0.0294) | −1.53148 |
| ST Safety Risk Index (%) | Per Equation 3, (−1.53148/−5) * 100 | 30.629% |

In one embodiment, the ST Safety Risk Index for multiple scenarios is calculated as follows:

Σ(TMEL (for safety)×Safety Severity) (assuming TMEL has been met for all scenarios with designed IPLs)

Σ(IEF×[(PFD of non-SIF IPL×SIF PFD)×(Time SIF NOT in Bypass/SST)+(PFD of non-SIF×(Time SIF in Bypass/SST)]×Safety Severity) where: IEF=Initiating Event frequency SST=Short Sample Time ST Safety Risk index (Multiple)=[Log of (Designed Safety Risk (Multiple)/Actual Safety Risk (Multiple))/ Log of Designed Safety Risk (Multiple))]*100

Baseline Control Measure (Multiple)=100−ST Safety Risk Index (Multiple)

In one embodiment, the PRI determination 600 includes a long-term (LT) risk determination. In contrast with a ST determination that only includes a SW time in bypass, an LT determination includes SIF time in bypass, SIF demands, and SIF on-time testing. In one embodiment, PRI determination 600 includes a long-term risk determination, such as determined over one or more moths to provide a plant operations or maintenance manager to understand a long-term status of a progress plant. In one embodiment the LT termination identifies a highest ST safety risk index. In one embodiment, the assumptions for calculating the LT Safety Risk Index include the following:

The LT is determined for a scenario that includes an unacceptable risk criterion without safeguards Safety is the driver for this hazardous event (e.g., not commercial or environment)

An actual PFD of SIF and non-SIF IPL may not be the same as PFD per design

SIF IPL input includes 1:1 input voting

In one embodiment, LT safety risk index variables include the following:

SIF demand rate, where if the SIF demand rate is greater than an assumed IEF, then SIF demand rate will be considered in an actual LT Safety Risk determination SIF time in bypass over a period associated with a long-term period IPLs on-time testing (e.g., testing periodicity, deviation from which may affect an actual PFD of IPLs)

In one embodiment, LT safety risk index data is available in a Plant Historian and Computer Maintenance Management System, CMMS. In one embodiment, the LT safety risk index is calculated for a single scenario as follows:

Designed Long Term Safety Risk=TMEL (for safety)× Safety Severity (the assumption here is that with the designed safeguards, the TMEL has been met)

Actual LT Safety Risk=SIF demands×[(actual PFD of non-SIF IPL×SIF actual PFD)×(Time SIF NOT in Bypass/LST)+(PFD of non-SIF IPL)×(Time SIF in Bypass/LST)]×Safety Severity LT Safety Risk index=[Log of (Designed Safety Risk/ Actual Safety Risk)/Log of Designed Safety Risk)]× 100

LT Baseline Control Measure=100−Safety Risk Index

Assumptions:

SIF demands considered as Initiating Event Frequency if SIF demands>IEF LST=Large Sample Time PFD actual (for SIF and IPL) varies based on "Real test intervals" vs "Design Test intervals"

In one embodiment, the LT Safety Risk Index is calculated as shown in Table 4:

TABLE 4

LT Risk Index

| Parameter | Source | Value |
|---|---|---|
| TMEL | Risk and TMEL definition | 1E−05 |
| Safety Severity of "2" | Risk Matrix (FIG. 6) | Single fatality |
| SIF demands per year | Assumption (from Historian data), 1 per year > 1 in 10 years (IEF) | 1 per year |
| PFD of PSV-1 | Designed to fill the Risk Gap per Table 1 | 0.01 |
| PFD of SIP-1 | Designed to fill the Risk Gap per Table 1 | 0.01 |
| actual PDF of PSV-1 | Based on On-Time testing data | 0.01 |
| actual PDF of SIF-1 | Based on On-Time testing data | 0.01 |
| LST | Assumption | 12 months |
| SIF-1 Input Bypassed | Assumption (from Historian data) | 2 months |
| Designed Safety Risk | Per Equation 1: TMEL (for safety) (1E−05) × Safety Severity (1) | 1E−05 fatalities/ year |

TABLE 4-continued

LT Risk Index

| Parameter | Source | Value |
|---|---|---|
| Actual LT Safety Risk | Per Equation 2: SIF demands (1) × [(actual PDF of non-SIF IPL(0.01) × SIF actual PDF (0.01)) × (Time SIF NOT in Bypass (10/12)/LST(1)) + (PFD of non-SIF IPL(0.01)) × (Time SIF in Bypass (2/12)/LST(1))] × Safety Severity (1) | 2.65E−04 fatalities/ year |
| Designed Safety Risk/ LT Actual Safety Risk | (1E−05)/(2.65E−04) | 0.0377 |
| Log of (LT Designed Safety Risk) | Log (1E−05) | 5 |
| Log of (Designed Safety Risk/LT Actual Safety Risk) | Log (0.0377) | −1.423 |
| LT Safety Risk Index (%) | Per Equation 3, (−1.423/−5) * 100 | 28.464% |

In one embodiment, the LT Safety Risk index is modified for multiple scenarios. In one embodiment, a designed LT Safety Risk index includes a summation of TMEL and safety severity for each scenario. This designed LT Safety Risk Index assumes that with the designed IPLs, the TMEL has been met for all scenarios. In one embodiment, LI safety risk index for multiple scenarios is calculated for a single scenario as follows:

Σ(SIF demands×[(actual PDF of non-SW IPL×SW actual PDF)×(Time SW NOT in Bypass/LST)+(actual PDF of non-SW IPL)×(Time SIF in Bypass/LST)]×Safety Severity)

This assumes that SIF demands considered as Initiating Event Frequency if SIF demands>IEF LST=Large Sample Time, and that the actual PDF (for SW and IPL) varies based on "Real test intervals" vs "Design Test intervals."

LT Safety Risk Index (Multiple)=[Log of (Designed Safety Risk (Multiple)/Actual Safety Risk (Multiple))/ Log of Designed Safety Risk (Multiple)]×100

Worst actor of LT Safety Risk Index=Highest LT Safety Risk Index (ONE scenario)

FIG. 7 is a flowchart illustrating a computer implemented method 700 for process safety risk matrix generation and display. Method 700 begins with operation 705 by receiving a request to display a process safety risk matrix associated with a process facility. In response to receiving the request, method 700 includes displaying the process safety risk matrix. The display of the process safety risk matrix includes displaying a 2-dimensional representation of a plurality of risk matrix cells, each of the plurality of risk matrix cells associated with a mutually unique combination of a likelihood level and a severity level. In response to receiving the request, method 700 includes generating a baseline control measure based on the first likelihood level and the first severity level associated with the hazardous process event scenario. In one embodiment, the determination of the baseline control measure is based on the TMEL and the Safety Severity. In one embodiment, the determination of the baseline control measure is based on a baseline number of hazardous event scenarios.

At operation 710, in response to receiving the request, method 700 includes generating a hazardous scenario corrective action based on the hazardous process event scenario. In one embodiment, a process safety operator alert is generated to notify a process safety operator of the hazardous scenario corrective action. In one embodiment, a shutdown of a process associated with the hazardous process event scenario is initiated, wherein the process safety operator alert includes an identification of the process associated with the hazardous process event scenario.

At operation 715, a first graphic indication of a hazardous process event scenario is displayed within a first cell within the process safety risk matrix. The first cell corresponds to a first likelihood level and a first severity level associated with the hazardous process event scenario. At operation 720, a first location associated with the first cell is determined based on a Target Mitigated Event Likelihood (TMEL) and a Safety Severity associated with the hazardous process event scenario. In one embodiment, the first likelihood level is determined based on the TMEL, and the severity level is determined based on the Safety Severity.

At operation 725, a second graphic indication is displayed on a second cell within the process safety risk matrix. The second graphic indication identifies a change in a hazardous scenario count associated with the second cell. In one embodiment, the display of the second graphic indication includes displaying a numeric indication of the hazardous scenario count associated with the second cell. At operation 730, the display of the first graphic indication of a hazardous process event scenario includes displaying an active cell color within the first cell and displaying an inactive cell color within a plurality of inactive cells.

In one embodiment, at operation 735, a graphical measure indication of the baseline control measure is displayed. In one embodiment, at operation 740, a control measure historical graph is displayed, the historical graph including a plurality of historical control measures and the determined baseline control measure. In one embodiment, the determination of the baseline control measure is based on an overall safety risk index.

In one embodiment, at operation 745, an overall safety risk is determined based on a quotient of a determined safety risk numerator and a determined safety risk denominator. In one embodiment, the safety risk denominator is determined as a log of a designated safety risk and the safety risk numerator is determined as a log of the quotient of the designated safety risk divided by the actual safety risk. In one embodiment, determining the overall safety risk is based on a record of safety instrumented function (SIF) time in bypass. In one embodiment, determining the overall safety risk is based on a record of historic SIF demands and based on a record of historic SIF on-time testing.

In one embodiment, at operation 750, a plurality of event categories is determined based on the hazardous process event scenario, and a table of the plurality of event categories is displayed. In one embodiment, the plurality of event categories include at least one of bypass, demand, spurious trip, and late testing. In one embodiment, the display of the table of the plurality of event categories includes displaying an event count associated with each of the plurality of event categories.

In one embodiment, at operation 755, an indication of a hazardous process event occurrence is received, and a corrective action recommendation is determined and displayed based on the hazardous process event occurrence. In one embodiment, at operation 760, a corrective action status change associated with the corrective action recommendation is received and displayed. In one embodiment, receiving the corrective action status change includes receiving at least one of a shelving indication, a progressing indication, and a completion indication.

Figure 8:
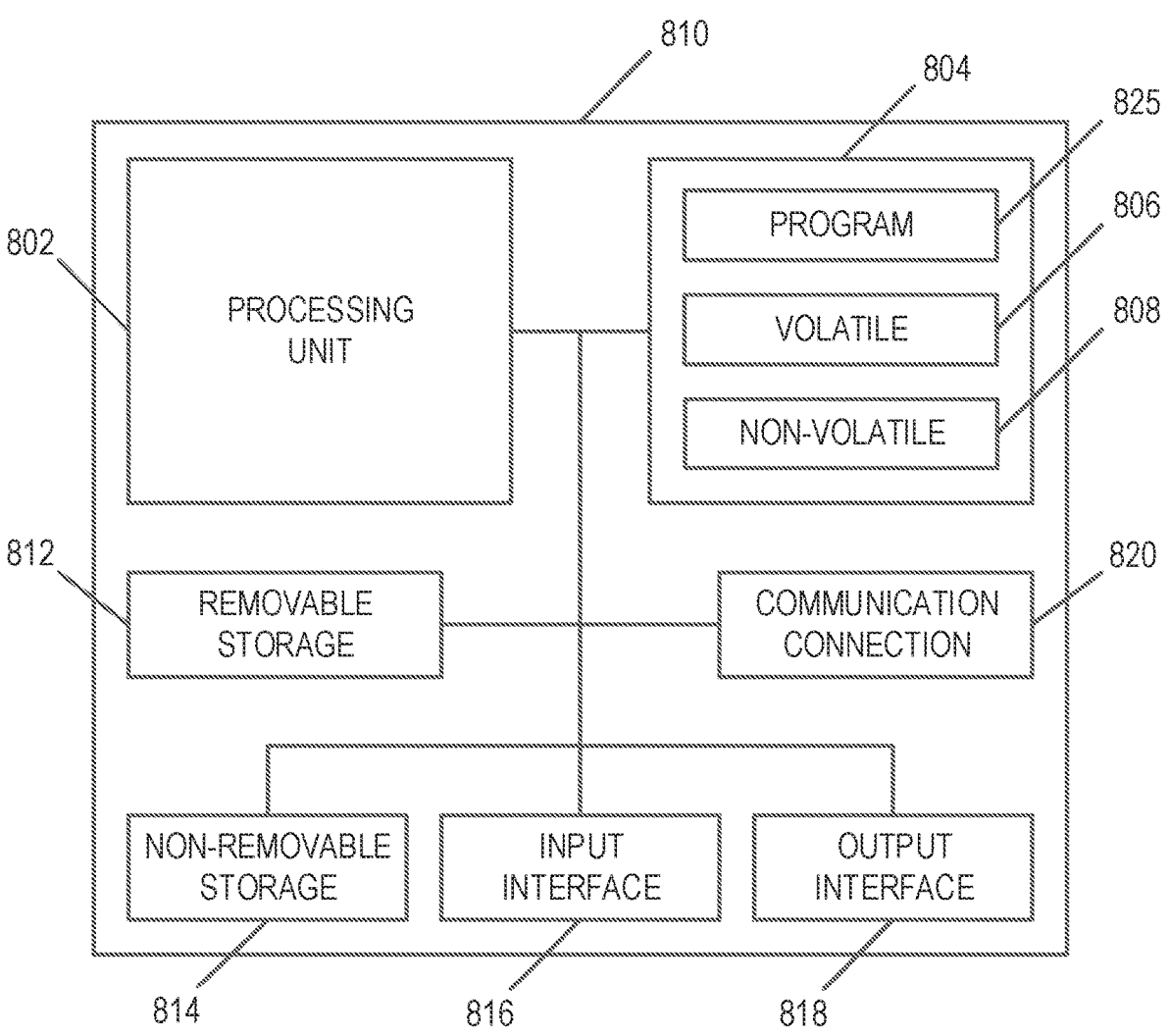
FIG. 8 is a block schematic diagram of a computer system to perform process safety risk matrix functions according to example embodiments according to an example embodiment.

In one embodiment, a first device includes one or more processors; memory; and one or more programs stored in memory, the one or more programs including instructions for performing the operations described above, including the operations shown and described with respect to FIG. 7. In one embodiment, a non-transitory computer-readable storage medium includes one or more programs for execution by one or more processors of a first device, the one or more programs including instructions which, when executed by the one or more processors, cause the first device to perform the operations described above, including the operations shown and described with respect to FIG. 7, FIG. 8 is a block schematic diagram of a computer system 800 to perform process safety risk matrix functions according to example embodiments. All components need not be used in various embodiments.

One example computing device in the form of a computer 800 may include a processing unit 802, memory 803, removable storage 810, and non-removable storage 812. Although the example computing device is illustrated and described as computer 800, the computing device is in different forms in different embodiments. For example, the computing device may instead be a smartphone, a tablet, smartwatch, smart storage device (SSD), or other computing device including the same or similar elements as illustrated and described with regard to FIG. 8, Devices, such as smartphones, tablets, and smartwatches, are generally collectively referred to as mobile devices or user equipment.

Although the various data storage elements are illustrated as part of the computer 800, the storage may also or alternatively include cloud-based storage accessible via a network, such as the internet or server-based storage. Note also that an SSD may include a processor on which the parser is run, allowing transfer of parsed, filtered data through I/O channels between the SSD and main memory.

Memory 803 may include volatile memory 814 and non-volatile memory 808. Computer 800 may include or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM, Digital Versatile Disks (DVD) or other optical disk storage, magnetic cassettes, magnetic tape, magnetic disk storage or other magnetic storage devices, or any other medium capable of storing computer-readable instructions.

Computer 800 may include or have access to a computing environment that includes input interface 806, output interface 804, and a communication interface 816. Output interface 804 may include a display device, such as a touchscreen, that also may serve as an input device. The input interface 806 may include one or more of a touchscreen, touchpad, mouse, keyboard, camera, one or more device-specific buttons, one or more sensors integrated within or coupled via wired or wireless data connections to the computer 800, and other input devices. The computer may operate in a networked environment using a communication connection to connect to one or more remote computers, such as database servers. The remote computer may include a personal computer (PC), server, router, network PC, a peer device, or other common data flow network switch, or the like. The communication connection may include a Local. Area Network (LAN), a Wide Area Network (WAN), cellular, Bluetooth, or other networks. According to one embodiment, the various components of computer 800 are connected with a system bus 820.

Computer-readable instructions stored on a computer-readable medium are executable by the processing unit 802 of the computer 800, such as a program 818. The program 818 in some embodiments comprises software to implement one or more method described herein. A hard drive, CD-ROM, and RAM are some examples of articles including a non-transitory computer-readable medium such as a storage device. The terms computer-readable medium and storage device do not include carrier waves to the extent carrier waves are deemed transitory. Storage can also include networked storage, such as a storage area network (SAN). Computer program 818 along with the workspace manager 822 is used to cause processing unit 802 to perform one or more methods or algorithms described herein.

Example 1 is a device comprising: a processor; and a memory device coupled to the processor and having a program stored thereon for execution by the processor to perform operations comprising: receiving a request to generate a process safety risk matrix associated with a process facility; in response to receiving the request, generating and displaying the process safety risk matrix, the display of the process safety risk matrix including: displaying a 2-dimensional representation of a plurality of risk matrix cells, each of the plurality of risk matrix cells associated with a mutually unique combination of a likelihood level and a severity level; and displaying a first graphic indication of a hazardous process event scenario within a first cell within the process safety risk matrix, the first cell corresponding to a first likelihood level and a first severity level associated with the hazardous process event scenario; and in response to receiving the request, generating a baseline control measure based on the first likelihood level and the first severity level associated with the hazardous process event scenario.

In Example 2, the subject matter of Example 1 includes, in response to receiving the request, generating a hazardous scenario corrective action based on the hazardous process event scenario; generating a process safety operator alert to notify a process safety operator of the hazardous scenario corrective action.

In Example 3, the subject matter of Examples 1-2 includes, initiating a shutdown of a process associated with the hazardous process event scenario, wherein the process safety operator alert includes an identification of the process associated with the hazardous process event scenario.

In Example 4, the subject matter of Examples 1-3 includes, determining the first likelihood level based on a Target Mitigated Event Likelihood (TMEL) associated with the hazardous process event scenario; and determining the first severity level based on a Safety Severity associated with the hazardous process event scenario.

In Example 5, the subject matter of Example 4 includes, wherein: the first likelihood level is determined based on the TMEL; and the severity level is determined based on the Safety Severity.

In Example 6, the subject matter of Examples 1-5 includes, wherein the determination of the baseline control measure is based on a baseline number of hazardous event scenarios.

In Example 7, the subject matter of Examples 1-6 includes, determining an overall safety risk index, wherein the determination of the baseline control measure is based on the determined overall safety risk index.

In Example 8, the subject matter of Examples 6-7 includes, determining a safety risk denominator as a log of a designated safety risk; and determining a safety risk numerator as a log of the quotient of the designated safety risk divided by the actual safety risk; wherein the determination of the overall safety risk index is based on the quotient of the safety risk numerator divided by the safety risk denominator.

In Example 9, the subject matter of Example 8 includes, wherein determining the overall safety risk index is based on a record of safety, instrumented function (SIF) time in bypass.

In Example 10, the subject matter of Examples 8-9 includes, wherein determining the overall safety risk index is based on a record of historic SIF demands and based on a record of historic SIF on-time testing.

In Example 11, the subject matter of Examples 1-10 includes, displaying a second graphic indication on a second cell within the process safety risk matrix, the second graphic indication identifying a change in a hazardous scenario count associated with the second cell.

In Example 12, the subject matter of Example 11 includes, wherein displaying the second graphic indication includes displaying a numeric indication of the hazardous scenario count associated with the second cell.

In Example 13, the subject matter of Examples 1-12 includes, wherein the display of the first graphic indication of a hazardous process event scenario includes displaying an active cell color within the first cell.

In Example 14, the subject matter of Example 13 includes, wherein the display of the 2-dimensional representation of a plurality of risk matrix cells includes displaying an inactive cell color within a plurality of inactive cells.

In Example 15, the subject matter of Examples 1-14 includes, generating a graphical measure indication of the baseline control measure; and displaying a numeric measure indication and the graphical measure indication of the baseline control measure.

In Example 16, the subject matter of Example 15 includes, displaying a control measure historical graph, the historical graph including a plurality of historical control measures and the determined baseline control measure.

In Example 17, the subject matter of Examples 1-16 includes, determining a plurality of event categories based on the hazardous process event scenario; and displaying a table of the plurality of event categories.

In Example 18, the subject matter of Example 17 includes, wherein the plurality of event categories include at least one of bypass, demand, spurious trip, and late testing.

In Example 19, the subject matter of Examples 17-18 includes, wherein the display of the table of the plurality of event categories includes displaying an event count associated with each of the plurality of event categories.

In Example 20, the subject matter of Examples 1-19 includes, receiving an indication of a hazardous process event occurrence; determining a hazardous event corrective action recommendation based on the hazardous process event occurrence; and displaying the hazardous event corrective action recommendation.

In Example 21, the subject matter of Example 20 includes, receiving a corrective action status change associated with the corrective action recommendation; and displaying the corrective action status change.

In Example 22, the subject matter of Examples 20-21 includes, wherein receiving the corrective action status change includes receiving at least one of a shelving indication, a progressing indication, and a completion indication.

Example 23 is a method, comprising: at a first device with one or more processors and memory: receiving a request to generate a process safety risk matrix associated with a process facility; in response to receiving the request, generating and displaying the process safety risk matrix, the display of the process safety risk matrix including: displaying a 2-dimensional representation of a plurality of risk matrix cells, each of the plurality of risk matrix cells associated with a mutually unique combination of a likelihood level and a severity level; and displaying a first graphic indication of a hazardous process event scenario within a first cell within the process safety risk matrix, the first cell corresponding to a first likelihood level and a first severity level associated with the hazardous process event scenario; and in response to receiving the request, generating a baseline control measure based on the first likelihood level and the first severity level associated with the hazardous process event scenario.

In Example 24, the subject matter of Example 23 includes, in response to receiving the request, generating a hazardous scenario corrective action based on the hazardous process event scenario; generating a process safety operator alert to notify a process safety operator of the hazardous scenario corrective action.

In Example 25, the subject matter of Examples 23-24 includes, initiating a shutdown of a process associated with the hazardous process event scenario, wherein the process safety operator alert includes an identification of the process associated with the hazardous process event scenario.

In Example 26, the subject matter of Examples 23-25 includes, determining the first likelihood level based on a Target Mitigated Event Likelihood (TMEL) associated with the hazardous process event scenario; and determining the first severity level based on a Safety Severity associated with the hazardous process event scenario.

In Example 27, the subject matter of Example 26 includes, wherein: the first likelihood level is determined based on the TMEL; and the severity level is determined based on the Safety Severity.

In Example 28, the subject matter of Examples 23-27 includes, wherein the determination of the baseline control measure is based on a baseline number of hazardous event scenarios.

In Example 29, the subject matter of Examples 23-28 includes, determining an overall safety risk index, wherein the determination of the baseline control measure is based on the determined overall safety risk index.

In Example 30, the subject matter of Examples 28-29 includes, determining a safety risk denominator as a log of a designated safety risk; and determining a safety risk numerator as a log of the quotient of the designated safety risk divided by the actual safety risk; wherein the determination of the overall safety risk index is based on the quotient of the safety risk numerator divided by the safety risk denominator.

In Example 31, the subject matter of Example 30 includes, wherein determining the overall safety risk index is based on a record of safety instrumented function (SIF) time in bypass.

In Example 32, the subject matter of Examples 30-31 includes, wherein determining the overall safety risk index is based on a record of historic SIF demands and based on a record of historic SIF on-time testing.

In Example 33, the subject matter of Examples 23-32 includes, displaying a second graphic indication on a second cell within the process safety risk matrix, the second graphic indication identifying a change in a hazardous scenario count associated with the second cell.

In Example 34, the subject matter of Example 33 includes, wherein displaying the second graphic indication includes displaying a numeric indication of the hazardous scenario count associated with the second cell.

In Example 35, the subject matter of Examples 23-34 includes, wherein the display of the first graphic indication of a hazardous process event scenario includes displaying an active cell color within the first cell.

In Example 36, the subject matter of Example 35 includes, wherein the display of the 2-dimensional representation of a plurality of risk matrix cells includes displaying an inactive cell color within a plurality of inactive cells.

In Example 37, the subject matter of Examples 23-36 includes, generating a graphical measure indication of the baseline control measure; and displaying a numeric measure indication and the graphical measure indication of the baseline control measure.

In Example 38, the subject matter of Example 37 includes, displaying a control measure historical graph, the historical graph including a plurality of historical control measures and the determined baseline control measure.

In Example 39, the subject matter of Examples 23-38 includes, determining a plurality of event categories based on the hazardous process event scenario; and displaying a table of the plurality of event categories.

In Example 40, the subject matter of Example 39 includes, wherein the plurality of event categories include at least one of bypass, demand, spurious trip, and late testing.

In Example 41, the subject matter of Examples 39-40 includes, wherein the display of the table of the plurality of event categories includes displaying an event count associated with each of the plurality of event categories.

In Example 42, the subject matter of Examples 23-41 includes, receiving an indication of a hazardous process event occurrence; determining a hazardous event corrective action recommendation based on the hazardous process event occurrence; and displaying the hazardous event corrective action recommendation.

In Example 43, the subject matter of Example 42 includes, receiving a corrective action status change associated with the corrective action recommendation; and displaying, the corrective action status change.

In Example 44, the subject matter of Examples 42-43 includes, wherein receiving the corrective action status change includes receiving at least one of a shelving indication, a progressing indication, and a completion indication.

Example 45 is at least one machine-readable medium including instructions that, when executed by processing circuitry, cause the processing circuitry to perform operations to implement of any of Examples 1-44.

Example 46 is an apparatus comprising means to implement of any of Examples 1-44.

Example 47 is a system to implement of any of Examples 1-44.

Example 48 is a method to implement of any of Examples 1-44.

Although a few embodiments have been described in detail above, other modifications are possible. For example, the logic flows depicted in the figures do not require the particular order shown, or sequential order, to achieve desirable results. Other steps is provided, or steps is eliminated, from the described flows, and other components is added to, or removed from, the described systems. Other embodiments is within the scope of the following claims.

The invention claimed is:

1. A device comprising:

a processor; and a memory device coupled to the processor and having a program stored thereon for execution by the processor to perform operations comprising:

receiving a request to generate a process safety risk matrix associated with a process facility;

in response to receiving the request, generating and displaying—the process safety risk matrix, on a dashboard interface controlled by the processor, wherein visualization of the process safety risk matrix is dynamic and shows real-time changes in process risk, the display of the process safety risk matrix including:

displaying a 2-dimensional representation of a plurality risk matrix cells, each of the plurality of risk matrix cells associated with a mutually unique combination of a likelihood level and a severity level; and displaying a first graphic indication of a hazardous process event scenario within a first cell within the process safety risk matrix, the first cell corresponding to a first likelihood level and a first severity level associated with the hazardous process event scenario;

in response to receiving the request, generating a baseline control measure based on the first likelihood level and the first severity level associated with the hazardous process event scenario; and determining, based on the hazardous process event scenario, a plurality of event categories and displaying, on the dashboard interface, a table of the plurality of event categories including at least one of bypass, demand, spurious trip, and late testing, and an event count associated with each of the plurality of event categories.

2. The device of claim 1, including:

in response to receiving the request, generating a hazardous scenario corrective action based on the hazardous process event scenario; and generating a process safety operator alert to notify a process safety operator of the hazardous scenario corrective action.

3. The device of claim 1, including:

determining the first likelihood level based on a Target Mitigated Event Likelihood (TMEL) associated with the hazardous process event scenario; and determining the first severity level based on a Safety Severity associated with the hazardous process event scenario.

4. The device of claim 1, wherein the determination of the baseline control measure is based on a baseline number of hazardous event scenarios.

5. The device of claim 1, including displaying a second graphic indication on a second cell within the process safety risk matrix, the second graphic indication identifying a change in a hazardous scenario count associated with the second cell.

6. The device of claim 1, wherein the display of the first graphic indication of a hazardous process event scenario includes displaying an active cell color within the first cell.

7. The device of claim 1, including:

generating a graphical measure indication of the baseline control measure; and displaying, a numeric measure indication and the graphical measure indication of the baseline control measure.

8. The device of claim 1, including:

determining a plurality of event categories based on the hazardous process event scenario; and displaying a table of the plurality of event categories.

9. The device of claim 1, including:

receiving an indication of a hazardous process event occurrence;

determining a hazardous event corrective action recommendation based on the hazardous process event occurrence; and displaying the hazardous event corrective action recommendation.

10. A method, comprising:

at a first device with one or more processors and memory:

receiving a request to generate a process safety risk matrix associated with a process facility;

in response to receiving the request, generating and displaying the process safety risk matrix, on a dashboard interface controlled by the processor, wherein visualization of the process safety risk matrix is dynamic and shows real-time changes in process risk, the display of the process safety risk matrix including:

displaying a 2-dimensional representation of a plurality risk matrix cells, each of the plurality of risk matrix cells associated with a mutually unique combination of a likelihood level and a severity level; and displaying a first graphic indication of a hazardous process event scenario within a first cell within the process safety risk matrix, the first cell corresponding to a first likelihood level and a first severity level associated with the hazardous process event scenario;

in response to receiving the request, generating a baseline control measure based on the first likelihood level and the first severity level associated with the hazardous process event scenario; and determining, based on the hazardous process event scenario, a plurality of event categories and displaying, on the dashboard interface, a table of the plurality of event categories including at least one of bypass, demand, spurious trip, and late testing, and an event count associated with each of the plurality of event categories.

11. The method of claim 10, including:

in response to receiving the request, generating a hazardous scenario corrective action based on the hazardous process event scenario; and generating a process safety operator alert to notify a process safety operator of the hazardous scenario corrective action.

12. The method of claim 10, including:

determining the first likelihood level based on a Target Mitigated Event Likelihood (TMEL) associated with the hazardous process event scenario; and determining the first severity level based on a Safety Severity associated with the hazardous process event scenario.

13. The method of claim 10, wherein the determination of the baseline control measure is based on a baseline number of hazardous event scenarios.

14. The method of claim 10, including displaying a second graphic indication on a second cell within the process safety risk matrix, the second graphic indication identifying a change in a hazardous scenario count associated with the second cell.

15. The method of claim 10, wherein the display of the first graphic indication of a hazardous process event scenario includes displaying an active cell color within the first cell.

16. The method of claim 10, including:

generating a graphical measure indication of the baseline control measure; and displaying, a numeric measure indication and the graphical measure indication of the baseline control measure.

17. The method of claim 10, including:

determining a plurality of event categories based on the hazardous process event scenario; and displaying a table of the plurality of event categories.

18. The method of claim 10, including:

receiving an indication of a hazardous process event occurrence;

determining a hazardous event corrective action recommendation based on the hazardous process event occurrence; and displaying the hazardous event corrective action recommendation.

19. A non-transitory computer-readable storage medium comprising one or more programs for execution by one or more processors of a first device, the one or more programs including instructions which, when executed by the one or more processors, cause the first device to:

receive a request to generate a process safety risk matrix associated with a process facility;

in response to receiving the request, generate and display the process safety risk matrix, on a dashboard interface controlled by the one or more processors, wherein visualization of the process safety risk matrix is dynamic and shows real-time changes in process risk, the display of the process safety risk matrix including:

displaying a 2-dimensional representation of a plurality of risk matrix cells, each of the plurality of risk matrix cells associated with a mutually unique combination of a likelihood level and a severity level; and displaying a first graphic indication of a hazardous process event scenario within a first cell within the process safety risk matrix, the first cell corresponding to a first likelihood level and a first severity level associated with the hazardous process event scenario;

in response to receiving the request, generate a baseline control measure based on the first likelihood level and the first severity level associated with the hazardous process event scenario; and determine, based on the hazardous process event scenario, a plurality of event categories and display, on the dashboard interface, a table of the plurality of event categories including at least one of bypass, demand, spurious trip, and late testing, and an event count associated with each of the plurality of event categories.

20. The non-transitory computer-readable storage medium of claim 19, the instructions further causing the first device to:

determine the first likelihood level based on a Target Mitigated Event Likelihood (TMEL) associated with the hazardous process event scenario; and determine the first severity level based on a Safety Severity associated with the hazardous process event scenario.

* * * * *